C. E. TROWBRIDGE.
Spinning-Ring.
No. 201,302. Patented March 12, 1878.
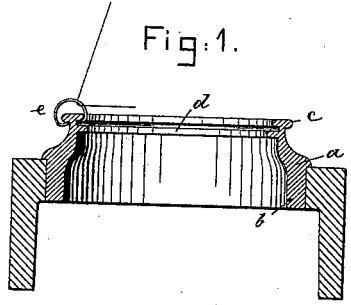
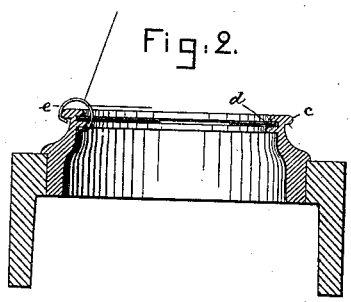
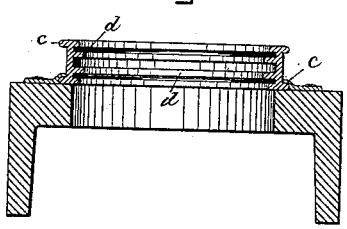
Witnesses.
L. A. Baxter
W. J. Pratt.
Inventor.
Charles E. Trowbridge
by Crosby & Gregory Atty.

UNITED STATES PATENT OFFICE.

CHARLES E. TROWBRIDGE, OF WHITINSVILLE, MASSACHUSETTS, ASSIGNOR TO HIMSELF AND ARTHUR F. WHITIN, OF SAME PLACE.

IMPROVEMENT IN SPINNING-RINGS.

Specification forming part of Letters Patent No. 201,302, dated March 12, 1878; application filed February 12, 1878.

*To all whom it may concern:*

Be it known that I, CHARLES E. TROWBRIDGE, of Whitinsville, county of Worcester, State of Massachusetts, have invented an Improvement in Spinning-Rings, of which the following is a specification:

This invention relates to an improved ring for spinning-machines; and consists in a ring provided at its end or ends with a duplex or double race, as hereinafter described.

The traveler, in its movement about the race, owing to centrifugal action, touches the outer flange of the race less and with less force than the inner portion of such race-flange. Consequently the principal portion of the wear of the traveler is upon the inner portion of the race-flange. Rings have been provided with races at their opposite ends, as in a patent granted to W. T. Carroll, No. 89,025, April 20, 1869, so that when one race was worn the other race could be used by inverting the ring.

In this my invention I place an auxiliary race-flange below the main race-flange within the ring, thereby making a duplex race at one and the same end of the ring.

Figure 1 of the drawing represents in section a ring and ring-rail, showing my invention embodied in connection with a common ring, the traveler being used upon the main race. Fig. 2 shows the traveler in position upon the auxiliary race, and Fig. 3 shows the invention applied to a double-raced ring of the Carroll kind.

The ring *a* has a shank, *b*, and a race, *c*, at its upper end, and the shank of the ring sets into the hole in the ring-rail, all as usual. This shank may be fitted into any usual holder, to adjust the ring into concentric position with reference to the spindle. Within a common shanked ring, below its main or usual race *c*, I add the auxiliary race *d*, it being a narrow projecting annulus, as shown in the drawings.

The traveler *e* in Fig. 1 is shown in position upon the main or usual race *c*. When such race becomes worn and unfit for further service, the traveler may be placed as shown in Fig. 2, it then co-operating with the auxiliary race *d*. The ring shown in Figs. 1 and 2 has its race of less diameter than its shank. Ordinarily, the outer diameter of the race will be greater than the outer diameter of the ring-shank. This ring (shown in Fig. 1) will cost no more to make than does a ring with a race at each end, and its holder which is commonly and necessarily employed to hold it in position upon or above the ring-rail.

By applying this my invention to an ordinary double-raced ring, as shown in Fig. 3, I am enabled, at a small expense, to convert such double-raced ring into a quadruple-raced ring, there being at each end of such ring two races.

I claim—

A spinning-ring provided at its end or ends with duplex traveler-races, to operate substantially as described.

In testimony whereof I have signed my name to this specification in the presence of two subscribing witnesses

CHARLES E. TROWBRIDGE.

Witnesses:
 H. A. GOODELL,
 EDWARD WHITIN.